June 1, 1943.  C. W. KANDLE  2,320,612
EARTH BORING TOOL
Filed June 27, 1941  2 Sheets-Sheet 1

Charles W. Kandle
INVENTOR.
BY
ATTORNEY.

June 1, 1943.   C. W. KANDLE   2,320,612
EARTH BORING TOOL
Filed June 27, 1941   2 Sheets-Sheet 2

Charles W. Kandle
INVENTOR.

BY
ATTORNEY.

Patented June 1, 1943

2,320,612

UNITED STATES PATENT OFFICE 2,320,612

EARTH BORING TOOL

Charles W. Kandle, Chicago, Ill.

Application June 27, 1941, Serial No. 399,967

2 Claims. (Cl. 255—69)

This invention relates to an earth boring tool.

Heretofore in the digging of post holes with power equipment it has been the practice to mount a heavy auger with special drive mechanism and feed screw on a large motor truck. The cost of such a machine was prohibitive to all except the large companies since a truck equipped with it was of practically no use for other purposes. Furthermore, the truck could not be run to many locations requiring post holes and such holes would then have to be dug by other means.

One of the principal objects of the present invention is to provide a simple and inexpensive boring tool which is light in weight and can be manually transported and which can be driven by an air turbine operated by a compressor.

Many companies have air compressors which are employed for various jobs including breaking of paving and rocks and the driving of machines of all kinds. Usually these compressors are mounted on trailer trucks and can be readily hauled to any location. The tool of the present invention can be loaded in or on such a trailer truck and when the location is reached it can be readily carried to any specific hole location within reach of the hose lines from the compressor; several hundred feet, if necessary. In this way holes can be drilled in locations inaccessible to trucks.

Another object of the present invention is to provide a manually directed power driven earth boring tool which can be utilized to bore vertically, horizontally or at any angle.

A more specific object of the invention is to provide for retarding the feed of an auger in earth so as to effect an efficient drilling operation.

Another specific object is to provide a simple auger construction for an earth boring tool.

A preferred embodiment of the invention is illustrated in the accompanying drawings in which.

Figure 1:
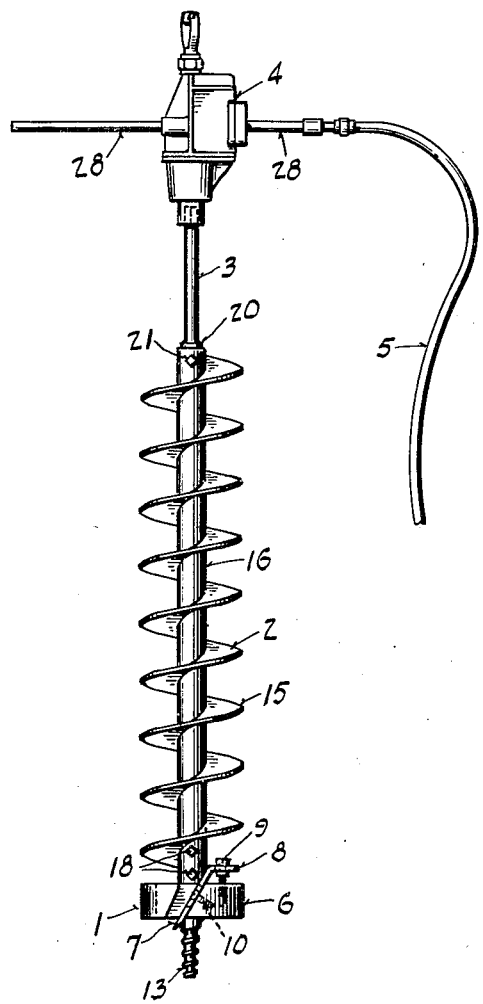
Figure 1 is a side elevation of the boring tool and drive mechanism.
Figure 2:
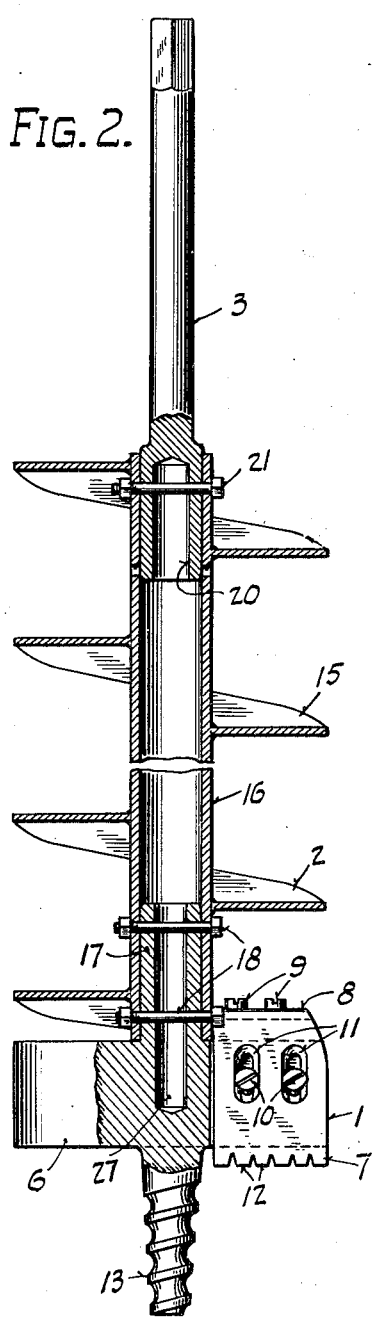
Fig. 2 is an enlarged vertical section through the upper and lower ends of the tool with the central portion broken away.
Figure 3:
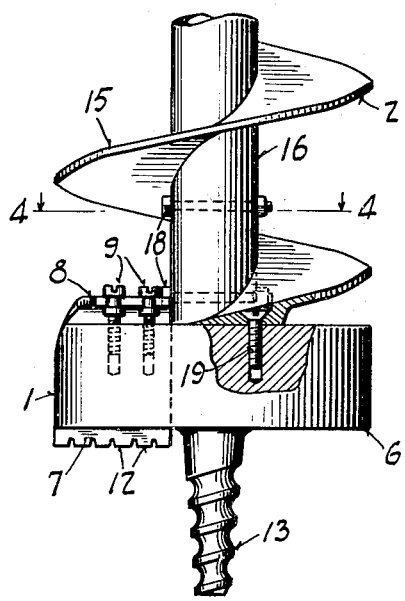
Fig. 3 is a detail view showing the attachment of the auger to the bit.
Figure 4:
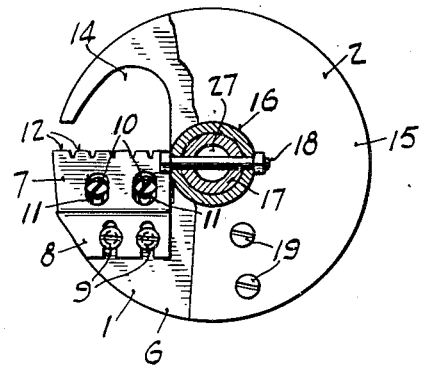
Fig. 4 is a transverse section on line 4—4 of Fig. 3.

As shown in Figure 1 the tool comprises a drill bit 1, an auger 2 which serves as the drill shaft, and a shank 3 for turning the same. The tool is driven preferably by a compressed air motor 4, the shaft of which has a non-circular axial opening receiving the complementary upper end of shank 3. The compressed air is fed to motor 4 through suitable flexible hose 5. In the event an electric motor is employed for driving the drill, wires will take the place of hose 5.

The bit is preferably of the type illustrated in the application for patent Serial No. 362,020, filed October 21, 1940, by the present inventor, for Drill bit. It comprises a circular plate or disc 6 of substantial thickness secured to the lower end of the auger 2 and having a portion cut away to provide a space for a cutting blade 7 extending at an angle therethrough and for spoil to pass upwardly over the top of the blade and onto the first convolution of the auger.

The blade 7 is set at an angle to the vertical, receding to the rear of the direction of rotation of the cutter and has a slotted substantially horizontal upper end 8 overlying the top of plate 6 and held in predetermined adjusted spaced relation thereto by means of adjusting screws 9. The screws 9 have circumferential grooves engaged by the slot edges of portion 8 of blade 7 to determine the heighth of the blade. The blade 7 is secured to the slanting edge of plate 6 by suitable screws 10 passing through vertical slots 11 in the blade.

The lower or cutting edge of blade 8 is preferably slotted to provide teeth 12 to more readily break up the spoil, and may be repeatedly ground to any desired sharpness. The exact adjustment of the heighth of the blade for the best efficiency will depend upon the type of soil encountered.

The disc 6 is of substantial thickness at its circumference to provide good bearing for keeping the hole straight.

A blunt leader 13 is also provided to assist in directing the cutter and to serve as a stop for protecting the cutter against large stone or for protecting ground pipes from the cutter should the boring be directed near such pipe and tile.

The disc 6 is preferably closed over its entire area except for a substantial space 14 ahead of blade 7. While spokes may be employed to support a rim portion it has been found that the additional openings so provided have a tendency to receive stones which are likely to clog the feed of the bit by raising the blade from the bottom of the hole being drilled.

The auger 2 comprises a flight of spiral convolutions 15 of relatively thin metal secured edgewise by butt welding to a central vertical tube or shaft 16. The pitch of the convolutions 15 may vary, a pitch of 5 inches being suitable for drilling vertical holes and one of about 9 inches being sufficient in the drilling of horizontal holes.

The tube or shaft 16 fits snugly over an upwardly extending central shank 17 on bit 1 and is secured thereto by any suitable means. The attachment shown comprises two bolts 18 extending through shaft 16 and shank 17. The shaft 16 may be threaded onto shank 17 but it is considered that the expense of threading is unnecessary. Bolts have the added advantage of transmitting reversal of rotation when necessary.

The lower convolution 15 of auger 2 has its lower end secured to the upper surface of disc 6 by screws 19.

The shank 3 has an enlarged lower end 20 extending into the upper end of tube 16 and a bolt 21 passes through the same to effect rotation of the auger and bit with the shank. The upper end of the shank 3 is preferably square in cross section to fit into the drive shaft of the motor 4.

Figure 5:
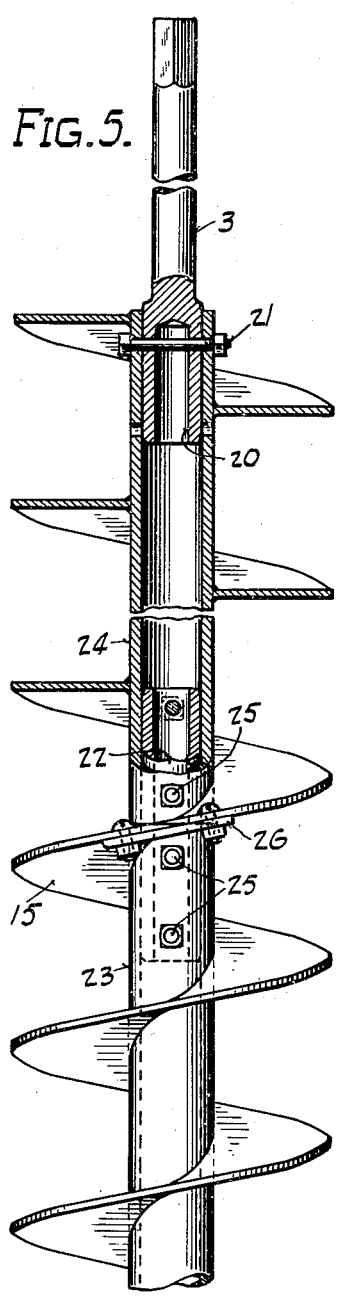
Fig. 5 is a vertical section showing a coupling between two auger sections.

When it is desired to drill deeper than the length of a standard flight of auger it is possible to couple two sections of auger together end to end with convolutions matching. Fig. 5 illustrates a suitable coupling in which the internal sleeve 22 overlaps the inside of the joint between the tubular shafts 23 and 24, and bolts 25 pass through the respective shafts and sleeve. Any number of sections may be added in this manner within practical limits of operation. If desired the meeting convolutions may also be secured together by joining plate 26 disposed beneath the joint and suitably bolted thereto.

The construction of the several joints is such as to provide a breaking or shear pin at the upper end so that in the event of too severe a load the connections between the bit 1 and auger 2 and the coupling between auger sections will not break and leave some part of the drill in the hole. For this purpose the connection of shank 3 to auger 2 is preferably made weaker than the other connections referred to so that bolt 21 will be the first to break in an emergency. In the event of such a shearing of bolt 21 the motor 4 can be removed and the auger 2 will still have its upper end above the ground to provide for ready lifting out of the hole.

The tubular shaft 16 and also shafts 23 and 24 are preferably hollow to lighten the weight of the device, and may also be utilized for feeding mud or liquid down to the cutter for keeping the latter cool and for removing spoil more readily. In such event the hollow part 27 of the disc 6 would have passages to the outside for outlet of the fluid and means would be provided for supplying the fluid to the rotating shaft at the upper end.

In practice the motor 4 is supported on the shank 3 and can be readily lifted therefrom. The motor 4 can be carried by means of two lateral handles 28 which serve to guide the boring operations. Two men can readily carry the tool and motor to location, assemble the same and guide the boring operation.

The weight of motor 4 and the pitch of the auger 2 is generally sufficient to automatically feed the tool into the ground without manual feed. The bit 1 is of a type (having horizontal plate 6) to prevent the auger from merely threading its way into the ground. It thus serves the function of retarding the feed and compelling a boring of the hole. The actual rate of digging, however, will depend upon the rate of rotation of the tool and the type of soil encountered. Speeds as rapid as those obtainable with the former auger type drills can be attained.

The tool is rugged and simple in construction and its parts can be readily adjusted and replaced by the ordinary operator. It serves as a readily available boring tool for operators of mobile compressor units, at relatively low cost.

Various embodiments of the invention may be employed within the scope of the accompanying claims.

The invention is claimed as follows:

1. A manually portable earth boring tool for drilling post holes and the like, comprising a rotating bit, a rotating shaft removably connected to the bit and having a flight of convolutions secured thereto, and a shank connected to the upper end of the shaft for driving the same, the last specified connection constituting a shearing connection for emergency to prevent breaking of the connection between the bit and shaft in the hole being drilled, said shearing connection being adapted to be removed to provide for the addition of another drill shaft section and for re-establishment of the shearing connection between the shank and the upper end of the added section, and being adapted to be disposed above ground level at all times.

2. A manually portable power operated earth boring tool for drilling post holes and the like, comprising a rotatable drill shaft having a flight of convolutions welded thereto for lifting spoil, said shaft and flight being made up of at least one of several like units adapted to be removably secured end to end for the progressive drilling of a hole of substantial depth, a portable power unit removably resting upon the upper end of said shaft and connected thereto to rotate the same, a horizontal plate of a diameter approximating that of said flight removably secured to the lower end of said shaft and flight to be rotated thereby, said plate serving to support the drill against threading into the earth under the weight of said power unit, shaft, and flight, a cutting blade secured to said plate in an opening therein adjacent and in front of the lower end of said flight and extending downwardly to engage and raise spoil onto said plate and flight, and a blunt nosed lead screw for holding the cutting blade in cutting relation at the bottom of the hole being drilled.

CHARLES W. KANDLE.